United States Patent
Denis et al.

[15] 3,663,107
[45] May 16, 1972

[54] NONDESTRUCTIVE METHOD FOR MEASURING STATES OF SURFACE AND APPARATUS FOR CARRYING OUT SAID METHOD

[72] Inventors: Pierre M. Denis, 4 place Paul Mistral, 38 Grenoble; Roger H. Guicherd, Rue du Mail, 38 Saint-Egreve, both of France

[22] Filed: Jan. 5, 1971

[21] Appl. No.: 103,994

[30] Foreign Application Priority Data

Jan. 6, 1970 France....................................7000205

[52] U.S. Cl. ............................356/120, 250/237 G, 356/209
[51] Int. Cl. .......................................................G01b 11/30
[58] Field of Search ........................356/109, 120, 167, 169; 250/237 G

[56] References Cited

UNITED STATES PATENTS 3,544,220  12/1970  Kaye......................................356/109

*Primary Examiner*—William L. Sikes
*Assistant Examiner*—Orville B. Chew, II
*Attorney*—Cameron, Kerkam & Sutton

[57] ABSTRACT

A beam of parallel rays which emerges from a perpendicular object-grid is reflected from a mirror surface and transmitted through a centered optical system to a Lummer dividing cube located at the image focal point of said system so as to produce a direct beam which is focused onto a photoelectric cell after passing through an image-grid and a beam which is deflected at right-angles and focused onto a second photoelectric cell. The image-grid is displaced transversely so as to stop light from the object-grid and the mirror surface is replaced by the surface to be studied. The quotient of the indications given by the two balanced photoelectric cells is characteristic of a given state of surface. The indication given by the deflected-beam cell provides the albedo of a given surface state and color.

2 Claims, 1 Drawing Figure

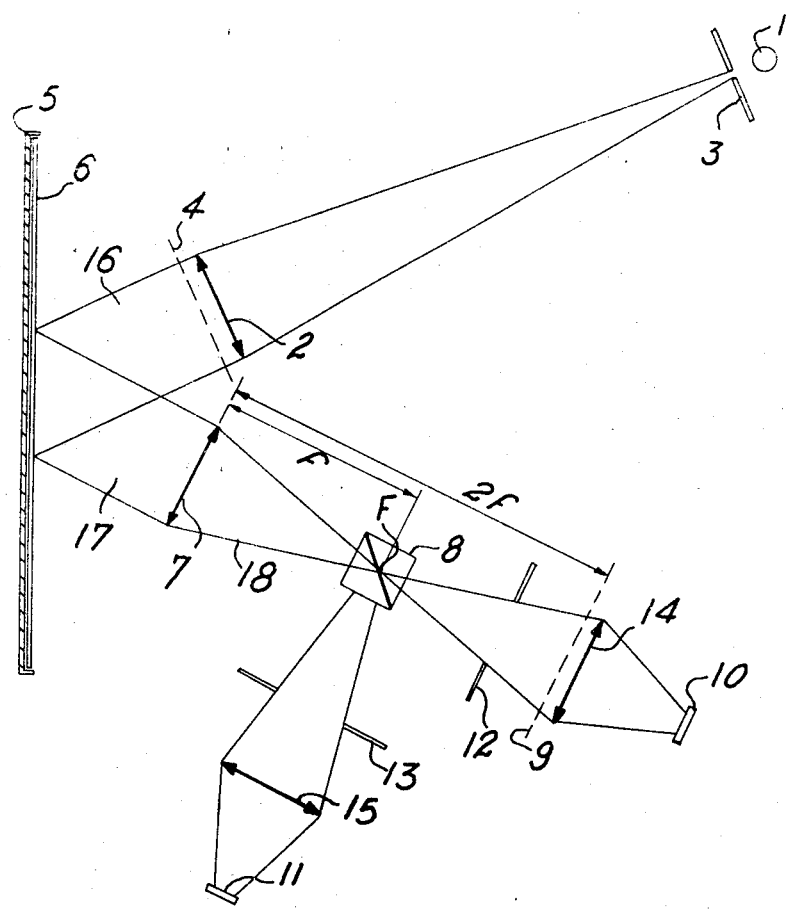

NONDESTRUCTIVE METHOD FOR MEASURING STATES OF SURFACE AND APPARATUS FOR CARRYING OUT SAID METHOD

This invention relates to a method of nondestructive measurement of states of surfaces as well as to an apparatus for carrying out said method.

It is already a known practice to make use of a probe having a calibrated tip which is displaced over the surface under study along a generator-line in the case of cylinders and at right angles to the direction of machining in the case of flat plates.

Probes of this type are fairly accurate but nevertheless have a disadvantage in that they permit determination of the state of surface only along a line. While this is an acceptable test in the case of a machined part having a constant or repetitive flaw, it is a method which cannot be applied to rolled or drawn plates having randomly distributed defects or flaws which entail the need for scanning of a small area and not solely along a line.

This invention is directed to a nondestructive method for measuring the state of surfaces which consists in projecting at an oblique angle onto a substantially flat portion of surface constituting an approximately perfect mirror a beam of parallel rays of stabilized intensity across which is placed a so-called object-grid at right angles to the axis of said beam, in placing a centered optical system across the reflected beam of parallel rays and at right angles to the axis thereof, in placing a Lummer dividing cube at the downstream focal point or image focal point of said centered system, the effect of said Lummer cube being to emit two beams having the same light intensity, one beam being direct in the line of extension of the incident beam and the other beam being deflected through 90° with respect to the first, in placing across said direct beam and at right angles to the principal axis thereof, a so-called image-grid which is identical with the object-grid and capable of small displacements in its plane, the two grids being located in the anti-principal planes of said centered optical system, said image-grid being locked in position so as to permit the light beams emitted by the object-grid to pass exactly through said image-grid, in focusing said direct beam and said deflected beam each onto a photoelectric cell, said two cells being so adjusted as to supply equal currents under the action of the light beam which falls on the Lummer cube, in displacing the image-grid in its plane so as to stop all the light beams emitted by the object-grid, and in replacing the portion of surface which performs the function of a perfect mirror by the portion of surface whose state is to be studied, the principle of said method being such that the quotient of the indications provided by the two photoelectric cells is characteristic of a given state of surface and that the indication provided by the photoelectric cell corresponding to the beam which is deflected by the cube provides the albedo of a given surface state and color.

A further object of the invention is to provide an apparatus for carrying out said method, said apparatus being characterized in that it comprises a stabilized stationary light source, a collimator for delivering a beam of parallel rays from said source, a support for disposing a substantially flat portion of surface at an oblique angle with respect to said beam, a so-called object-grid which is parallel to the lens of said collimator on the downstream side thereof and mounted across said parallel beam, a centered optical system, a Lummer cube mounted at the downstream focal point or image focal point of said centered system, a so-called image-grid which is positionally adjustable in its plane, the two grids being located in the anti-principal planes of said centered optical system, two photoelectric cells so arranged as to receive respectively the direct beam and the deflected beam omitted by said Lummer cube and two variable diaphragms placed across said direct and deflected beams.

Further properties and advantages of the present invention will become apparent from the following description which is given with reference to the single accompanying FIGURE and in which one embodiment of the apparatus according to the invention is given by way of explanation and not in any limiting sense.

The accompanying figure is a diagram whose plane is defined by the principal axis of the beam of parallel rays emitted by the collimator and by the principal axis of the beam of parallel reflected rays.

The apparatus in accordance with the invention as illustrated in this figure comprises a stationary stabilized light source 1, a collimator (lens 2 and variable slit 3), an object-grid 4, a stationary support 5 which is intended to receive a surface 6. In order to simplify the explanation of the operation of the apparatus, it will be assumed hereinafter that said surface is flat (firstly a surface which constitutes approximately a perfect mirror and secondly a surface whose state is to be determined), a centered optical system 7, a Lummer dividing cube 8, an image-grid 9 which is identical with the object-grid 4, two photoelectric cells 10 and 11, two variable diaphragms 12 and 13 which serve to balance said photoelectric cells and two convergent lenses 14 and 15 which serve to focus the light beams onto said two photoelectric cells.

Each photoelectric cell 10 and 11 is connected to a galvanometer or to a computer (not shown).

The grids 4 and 9 are disposed in the anti-principal planes of the centered system 7, said planes being located by definition on each side of said centered system at distances which are respectively equal to twice the object focal distance and to twice the image focal distance of said centered system 7.

The Lummer cube 8 is placed at the image focal point of said centered system.

By virtue of an arrangement of this type, the operation of the apparatus according to the invention is as follows:

First stage: the surface 6 being initially a surface which constitutes approximately a perfect mirror, the stabilized light source 1 illuminates the slit 3 of the collimator; the emergent beam of parallel rays 16 passes through the object-grid 4.

The beam is reflected from the flat surface 6 in a bundle of parallel rays 17 and, after having passed through the centered optical system 7, produces a convergent beam 18 which is focused at F, namely the image focal point of the centered system 7 which produces an image of the grid 4 on the other side of the point F.

By virtue of a conventional property of centered optical systems, the image of an object 4 which is located in the anti-principal object plane of the centered system 7 is formed in the other anti-principal plane of said system and is equal to said object and inverted.

In the present case, the image of the grid 4 is consequently formed in the plane of the grid 9.

Since the surface 6 is approximately a perfect mirror, the image appears as the replica of the first grid.

Since the image-grid 9 is so adjusted that the gaps of said grid are located on the path of the different light beams which are transmitted to said grid 9 from the object-grid 4, the photoelectric cell 10 receives the total quantity of light which has reached the grid 9.

One-half the light intensity of the beam 18 is deflected towards the cell 11 by the Lummer cube 8.

In order that the two photoelectric cells 10 and 11 should delivered strictly equal currents in respect of equal levels of illumination, said cells are balanced by means of the diaphragms 12 and 13.

The image-grid 9 is then displaced in its plane so that the bars of said grid are located on the path of the light beams which fall on said grid. In consequence, no light falls on the photoelectric cell 10.

Second state: the perfect mirror 6 is replaced by the surface to be studied. By virtue of a diffusion phenomenon which arises from the roughness of said surface, a certain quantity of light then passes through the grid 9, this quantity being a function of the roughness, and the photoelectric cell 10 is therefore excited. In actual fact, the intensity of the light which passes through the grid 9 is a function not only of the roughness of the surface under study but also of its color whilst the intensity of the light which is deflected by the Lummer cube 8 towards the photoelectric cell 11 depends only on the color of said surface.

Thus, if I designates the intensity of the light which is reflected from the surface 6, $a$ designates a coefficient which is a function of the color of said surface and $b$ designates a coefficient which is a function of the roughness, it is apparent that the quantity of light which falls on the photoelectric cell 10 is $I/2 \cdot a \cdot b$, while the quantity of light which falls on the photoelectric cell 11 is $I/2\ a$. The quotient of said intensities therefore has the value $b$ and consequently depends only on the roughness of the surface 6.

Since the electric current delivered by said photoelectric cells are proportional to the light intensities, it is apparent that the quotient of the indications supplied by said cells is a function only of the roughness of the surface 6 and is in no way dependent on its color.

So far as the photoelectric cell 11 alone is concerned, this cell delivers in respect of a surface 6 having a given color a current which is proportional to I and therefore also proportional to $I/I_0$ ($I_0$ being the intensity of light which impinges on the surface 6).

In other words, the photoelectric cell 11 serves to determine the albedo of the surface 6 which has a given color.

In the above-described experiment, the study is carried out along a preferential axis by virtue of the fact that the object and the image are provided by means of grids but it remains apparent that, depending on the nature of the surface 6 under study, it would be possible to replace the grids 4 and 9, for example, by square-mesh screens or by devices having axes of symmetry of a higher order. Moreover, instead of being flat, the surface 6 can be only substantially flat ; for example, it would be possible to make use of a cylindrical surface having a long radius of curvature ; finally, instead of being stationary, the surface 6 could be endowed with continuous motion.

It is readily apparent that this invention has been described in the foregoing solely by way of explanation without any limitation being implied and that any detail modifications could accordingly be made therein without departing either from the scope or the spirit of the invention.

We claim:

1. A nondestructive method for measuring the state of surfaces consisting of the steps of projecting at an oblique angle onto a substantially flat portion of surface constituting an approximately perfect mirror a beam of parallel rays of stabilized intensity, placing an object-grid at right angles to the axis of said beam, placing a centered optical system across the reflected beam of parallel rays and at right angles to the axis thereof, placing a Lummer dividing cube at the downstream focal point or image focal point of said centered system, said Lummer cube emitting two beams having the same light intensity, directing one beam in the line of extension of the incident beam, deflecting the other beam through 90° with respect to the first beam, placing across said direct beam and at right angles to the principal axis thereof an image-grid identical with the object-grid and capable of small displacements in its plane, locating two grids in the anti-principal planes of said centered optical system, said image-grid being locked in position so as to permit the light beams emitted by the object-grid to pass exactly through said image-grid, focusing said direct beam and said deflected beam each onto a photoelectric cell, adjusting said two photoelectric cells to supply equal currents under the action of the light beam on the Lummer cube, displacing the image-grid in its plane to stop all light beams emitted by the object-grid, and then replacing the portion of surface functioning as a perfect mirror by the portion of surface whose state is to be studied, the quotient of the currents from said two photoelectric cells being characteristic of a given state of surface and the current from said photoelectric cell corresponding to the beam which is deflected by said cube providing the albedo of a given surface state and color.

2. An apparatus for measuring the state of surfaces comprising a stabilized stationary light source, a collimator for delivering a beam of parallel rays from said source, a support for disposing a substantially flat portion of surface at an oblique angle with respect to said beam, a so-called object-grid which is parallel to the lens of said collimator on the downstream side thereof and mounted across said parallel beam, a centered optical system, a Lummer cube mounted at the downstream focal point or image focal point of said centered system, a so-called image-grid which is positionally adjustable in its plane, the two grids being located in the anti-principal planes of said centered optical system, two photoelectric cells so arranged as to receive respectively the direct beam and the deflected beam emitted by said Lummer cube and two variable diaphragms placed across said direct and deflected beams.

* * * * *

PO-1050
(5/69)

UNITED STATES PATENT OFFICE
CERTIFICATE OF CORRECTION

Patent No. 3,663,107      Dated May 16, 1972

Inventor(s) Pierre M. Denis and Roger H. Guicherd

It is certified that error appears in the above-identified patent and that said Letters Patent are hereby corrected as shown below:

[73] Assignee: Societe Anonyme Heurtey
     75 Paris 17 eme, France

Signed and sealed this 10th day of October 1972.

(SEAL)
Attest:

EDWARD M. FLETCHER, JR.      ROBERT GOTTSCHALK
Attesting Officer      Commissioner of Patents